United States Patent [19]
Takahara et al.

[11] Patent Number: 5,477,542
[45] Date of Patent: Dec. 19, 1995

[54] METHOD AND APPARTUS FOR CONTROLLING MULTIMEDIA INFORMATION COMMUNICATION

[75] Inventors: Keiko Takahara; Naoko Iwami; Susumu Matsui, all of Machida, Japan

[73] Assignee: Hitachi, Ltd., Tokyo, Japan

[21] Appl. No.: 216,942

[22] Filed: Mar. 24, 1994

[30] Foreign Application Priority Data

Mar. 30, 1993 [JP] Japan .................... 5-071278

[51] Int. Cl.[6] ................ H04L 12/56; H04J 3/22
[52] U.S. Cl. .............. 370/94.1; 370/60; 370/79; 370/110.1; 348/14; 348/462
[58] Field of Search .......................... 370/60, 60.1, 94.1, 370/94.2, 94.3, 79, 84, 110.1, 112; 348/10, 14, 423, 462

[56] References Cited

U.S. PATENT DOCUMENTS

| | | | |
|---|---|---|---|
| 4,864,562 | 9/1989 | Murakami et al. | 370/84 |
| 5,301,191 | 4/1994 | Otani | 370/84 |
| 5,367,522 | 11/1994 | Otani | 370/84 |

Primary Examiner—Hassan Kizou
Attorney, Agent, or Firm—Antonelli, Terry, Stout & Kraus

[57] ABSTRACT

A system in which multimedia information communication is performed between two terminal stations connected to each other through a packet switching network, each of the terminal stations having a control device for performing send control for sending a video packet including coded video data and a voice packet including coded voice data to the packet switching network and supply control for supplying the video packet and voice packet received from the packe switching network to a video codec and a voice codec respectively. One of the two terminal stations operating as a receive side issues a video data transmission mode change request to the other terminal station located at a multimedia information transmission side in accordance with a status of delay of video packets and/or voice packets received from the packet switching network, and the other of said terminal stations changes the video data transmission mode in response to the transmission mode change request, so that when the delay generated in the voice packet arrival interval exceeds a predetermined threshold value, video transmission is stopped and the operation mode is made to be a communication mode of only voice data.

14 Claims, 8 Drawing Sheets

METHOD AND APPARTUS FOR CONTROLLING MULTIMEDIA INFORMATION COMMUNICATION

BACKGROUND OF THE INVENTION

1. Field of the Invention

The present invention relates to a multimedia information communication system, and particularly to a method and apparatus for controlling multimedia communication so that the communication mode is automatically changed over in accordance with a load condition of a packet switching network in a system in which multimedia information communication is performed between two terminal stations through the packet switching network.

2. Description of the Related Art

Recently, TV phone systems and TV conference systems, in which terminal stations at remote locations are connected through communication lines have been developed. In video communication, the quantity of information to be transmitted is large and it is therefore desirable that a transmission bandwidth which is in accord with the information quantity can be secured. Presently, in a local area network provided in an office or the like, however, it is impossible for every user to secure necessary transmission bandwidth because of limitations in transmission capacity.

In a network to which terminal stations which may generate a large quantity of information such as video signals are connected, problems include that the bandwidth available by the network is changed greatly or that jitter is generated on delay time of information transmission in the network for reasons such as the data suddenly bursting into the network from one of the terminal stations.

Conventionally, for example, JP-A 3-270430 teaches a voice and video communication system which is provided with a function that a TV conference terminal station connected to an LAN measures the quantity of traffic to be sent out from its own side to the LAN and the current quantity of traffic on the LAN, and when both the measured traffic quantities are not less than predetermined threshold values with respect to video and voice signals, the terminal station gives a command to a voice coder-decoder (hereinafter referred to as "codec") and a video codec so as to reduce the information transmission quantity to the LAN.

Upon reception of such an information quantity reducing command, in the voice and video communication system, the video codec lowers the upper limit value of the information transmission quantity and the voice codec operates to reduce the information transmission quantity so that the increase of the end-to-end transmission delay is suppressed to thereby prevent the video and voice signals quality from deteriorating in the video and voice. In the above-mentioned technique, however, there is a problem that when the transmission delay is large even if the video and voice transmission quantity is reduced to its minimum value, it is impossible to maintain the quality of both media in the terminal station on the receiving side.

Further, JP-A 2-209043 teaches a data communication system in which an information frame transmission side terminal station judges the traffic state in a network on the basis of the receiving state of an arrival confirm frame/re-send request frame transmitted from a receive side terminal station, and when the transmission side terminal station concludes that the traffic quantity is large, the transmission side terminal station prolongs the send interval of the information frames to thereby control the traffic which flows into the network. This system however has a problem in that if this system is applied to a voice and video communication system which takes a serious view of real time property, the response operation of traffic control is slow because the traffic state is judged on the basis of the reception state of an arrival confirm frame/re-send request frame from the data receiving side.

SUMMARY OF THE INVENTION

It is therefore an object of the present invention to provide a transmission control method in multimedia information communication and a multimedia communication terminal station, in which, when traffic load of a communication network becomes so high that end-to-end transmission delay becomes too large to perform both video and voice communication, the information transmission mode is automatically changed while high quality communication is maintained at least with respect to voice data.

In order to achieve the above object, the present invention features a terminal station, operating as a video and voice data transmission side, controlling the multimedia data transmission mode in response to a transmission mode change request which another terminal station operating as a receiving side has issued in accordance with the traffic load of the communication network.

More specifically, a terminal station on the receiving side requests another terminal station on the transmission side to lower the video data transmission rate when the receiving side terminal station detects that the video packet transmission delay exceeds a predetermined threshold value because of an increase of the load of the network or the like, while the receiving side terminal station requests the transmission side terminal station to stop video data transmission in order to ensure the quality of voice communication when the receiving side terminal station detects that the voice packet transmission delay exceeds a predetermined limit value L1. In the state where the video is frozen on a display screen of the receiving side terminal station because the transmission side terminal station has stopped video data transmission, if the receiving side terminal station detects that the voice data packet transmission delay has decreased, the receiving side terminal station requests the transmission side terminal station to resume the video data transmission. In a preferred embodiment, the receiving side terminal station issues the video data transmission restart request when it detects that the voice data packet transmission delay becomes less than a predetermined lower limit value L2 which is lower than the above-mentioned limit value L1.

The foregoing and other objects, advantages, manner of operation and novel features of the present invention will be understood from the following description when read in conjunction with the accompanying drawings.

DESCRIPTION OF THE PREFERRED EMBODIMENTS

Referring to FIGS. 1 through 8, a first embodiment of the present invention will be described.

Figure 1:
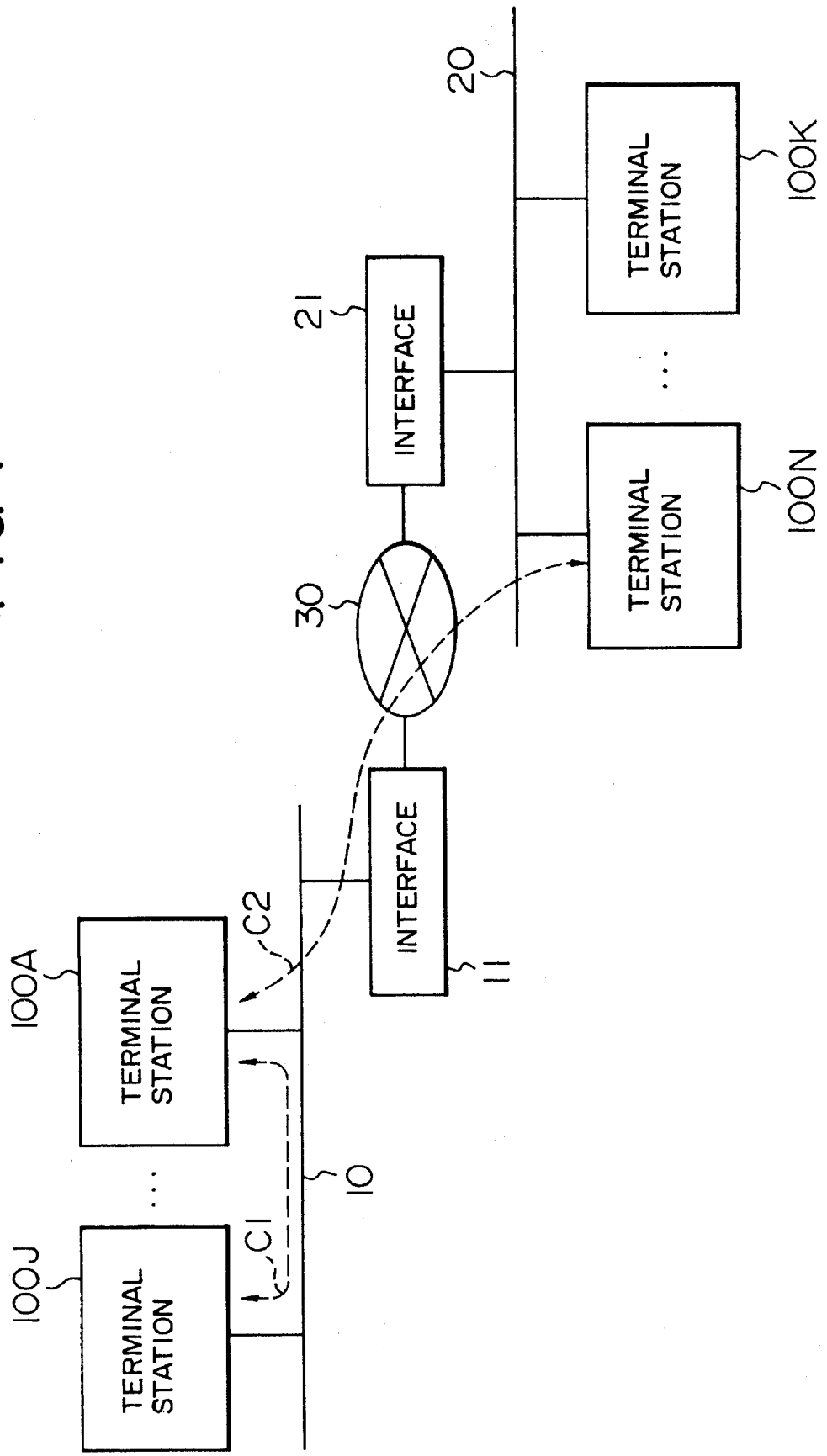
FIG. 1 is a block diagram showing an example of a network system constituted by a plurality of communication terminal stations to which the present invention is to be applied.

FIG. 1 shows an example of the network system for performing multimedia information communication according to the present invention.

In the network, communication terminal stations 100A through 100J are connected to a LAN 10 and communication terminal stations 100K through 100N are connected to another LAN 20. The LAN 10 and LAN 20 are connected to a packet switching network 30 through interfaces 11 and 21 respectively. Each of the communication terminal stations 100 (100A through 100N) has a function for processing multimedia information including video and voice data in addition to an ordinary function of data processing, so that, for example, not only multimedia communication C1 between the communication terminal stations 100A and 100J accommodated in one and the same LAN 10, but also multimedia communication C2 between the communication terminal stations 100A and 100N respectively accommodated in the LANs 10 and 20 connected to each other through the network 30, can be performed by means of packets. Alternatively, the communication terminal stations 100 may be connected to the packet switching network 30, not through the LAN 10 or 20, but directly.

Figure 2:
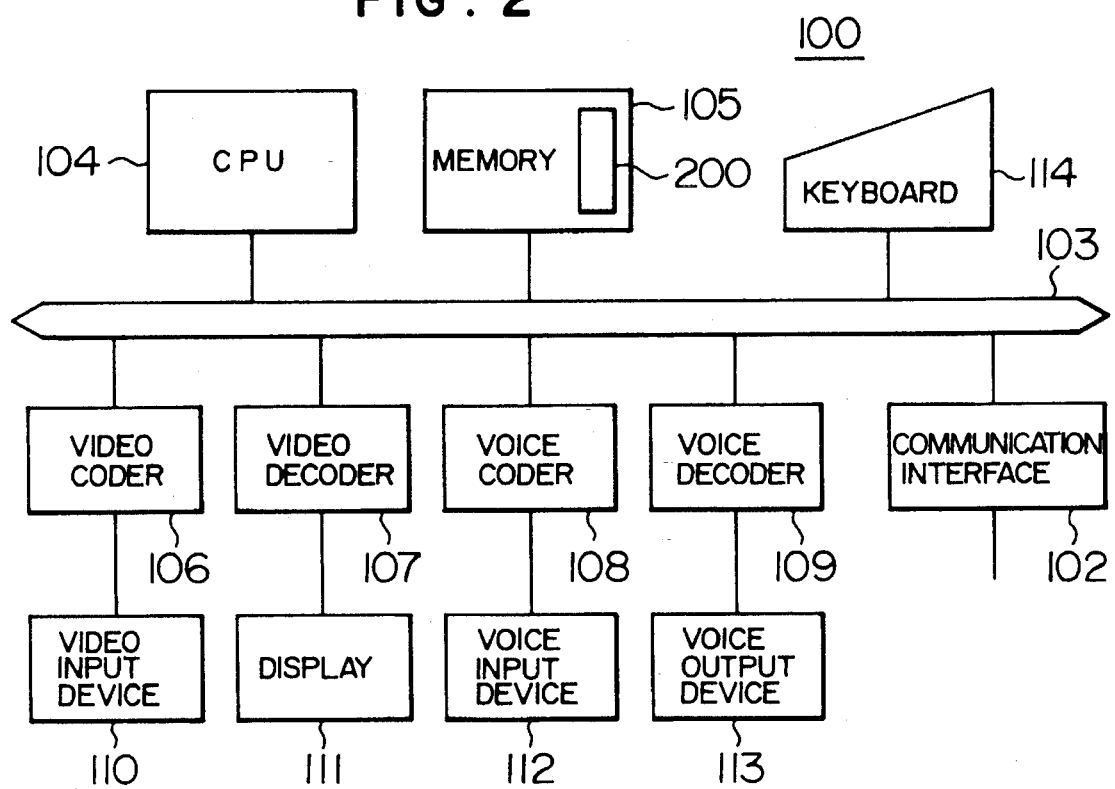
FIG. 2 is a block diagram showing the configuration of a communication terminal station.

FIG. 2 shows the configuration of each of the communication terminal stations 100 having a function of multimedia information communication control according to the present invention.

The communication terminal station 100 includes: a communication interface 102 for performing interface processing with respect to the LAN or communication network; an internal bus 103; a CPU 104 for performing, by using a software, video and voice data transmission control (hereinafter, simply referred to as "multimedia communication control") which will be described later; and a memory 105 for storing various programs and data including a program 200 for performing the function of the multimedia communication control.

The communication terminal station 100 further includes: a video coder 106 for converting an analog video signal supplied from a video input device 110, such as a camera or the like into a digital video signal and then for compressing and coding the digital video signal; a video decoder 107 for decompressing and decoding compressed and coded video data, and then for converting the decompressed and decoded video data into an analog video signal; a voice coder 108 for converting an analog voice signal supplied from a voice input device 112, such as a microphone or the like, into coded voice data; a voice decoder 109 for decoding coded voice data and for converting the decoded voice data into an analog voice signal; a display unit 111 provided with a screen for displaying video information thereon; a voice output device 113 for outputting voice information; and a keyboard 114 for entry of commands and data.

The display unit 111 is capable of displaying not only video data but also data from an application program executed by the CPU 104 on one and the same screen at the same time utilizing a multi-window function provided in an ordinary workstation or communication terminal station. For the sake of simplification, however, functional elements unrelated to video and voice data, though related to the communication control according to the present invention are omitted in FIG. 2.

Figure 3:
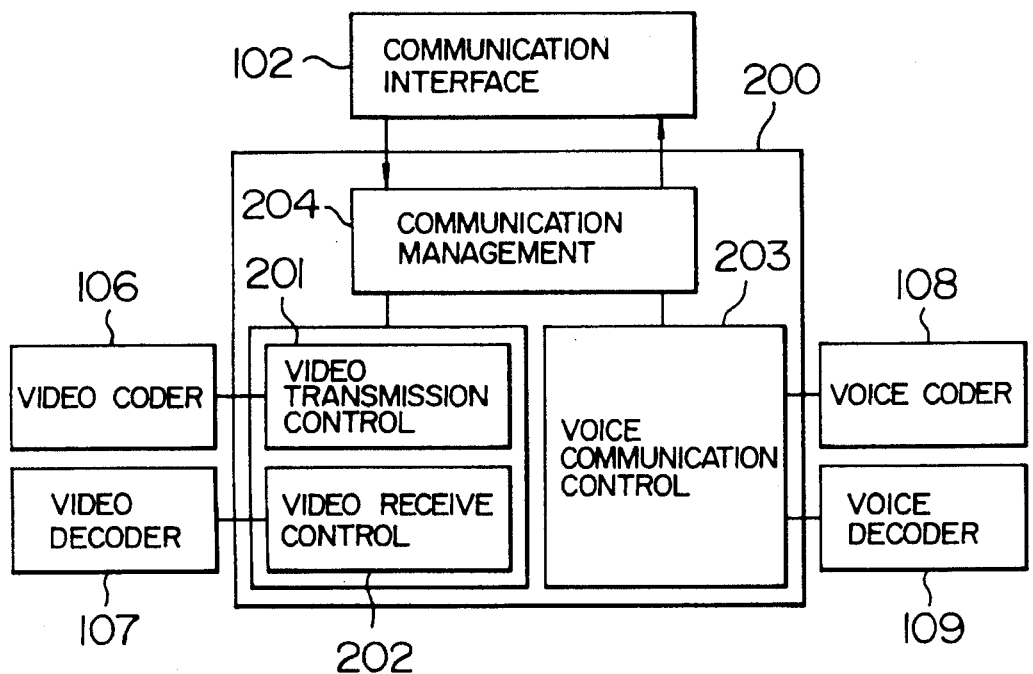
FIG. 3 is a block diagram showing a function of a program for multimedia communication control, provided in the communication terminal station.

FIG. 3 shows the configuration of the multimedia communication control program 200 stored in the memory 105.

The multimedia communication control program 200 is constituted by: a video transmission control unit 201 for controlling a reading rate (a coding rate) for reading coded video data from the video coder 106 to thereby control the packet transmission interval for sending video packets including coded video data to the network; a video receiving control unit 202 for controlling a supplying rate (a decoding rate) for supplying coded video data extracted from a video packet to the video decoder 107 in accordance with the receiving state of video packets received from another communication terminal station; a voice communication control unit 203 for performing transmission/receive control of a voice packet including coded voice data to/from the network; and a communication management unit 204 for making delivery of multimedia data between the communication management unit 204 and the communication interface 102. The communication management unit 204 controls the operations of the video transmission control unit 201, the video receiving control unit 202, and the voice transmission control unit 203.

The video transmission control unit 201 has a function for receiving, through the communication management unit 204, a coding rate change request (a rate change command) and a communication mode change request (a video stop/resume command) for instructing stop/resume of video transmission, the requests being issued from a mate communication terminal station. The video transmission control unit 201 has a further function for reading video data from the video coder 106 at a coding rate (a packet transmission interval) designated by the rate change command and a video packet transmission function for editing the coded video data read from the video coder 106 into a video data packet having a predetermined format shown in FIG. 5 and for transmitting the video data packet to the communication management unit 204. Each of the video data packets has, as a time stamp, packet transmission time obtained from a timer 120 which indicates current time on the basis of internal clocks of the CPU.

The video receiving control unit 202 has: a function for controlling supply of coded video data extracted from a video packet received from the communication management unit 204 to the video decoder 107; a function for calculating an average of the packet arrival intervals of video packets and for calculating an average of the packet transmission intervals from packet transmission time extracted from video packets; a function for issuing a coding rate change request (a rate change command) to a terminal station to receive the video data when delay time represented by a difference value Δt between an average packet arrival interval ΔT and an average packet transmission interval ΔR is larger than a predetermined threshold value and a function for issuing a video stop command to the transmission side terminal station when the average packet arrival interval ΔR has reached a predetermined limited value RTmax. The video stop command may be controlled on the basis of the result of judgment as to whether the voice communication control unit 203 has issued a video stop request or not.

Figure 4:
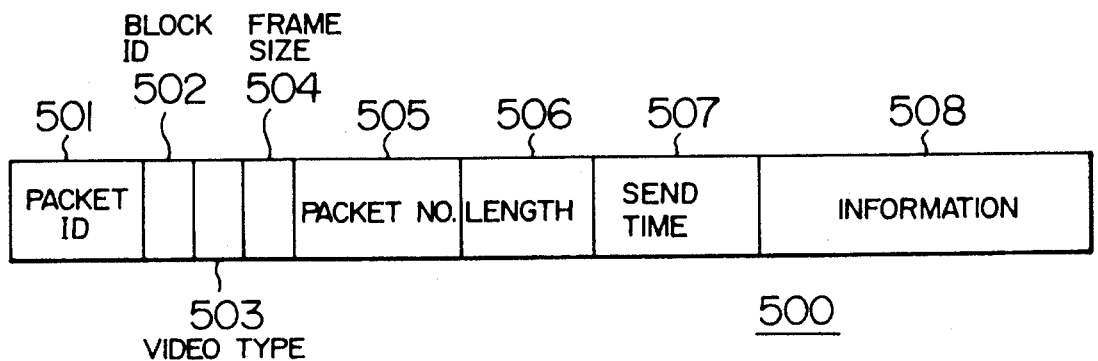
FIG. 4 is a view showing a format of a coded video data packet.

FIG. 4 shows an example of the format of a coded video data packet 500.

The coded video data packet 500 is constituted by: a packet ID field 501 which indicates whether the information contained in an information field 508 is video data or a control command; a field 502 which indicates whether a video data is that of a head portion of one video frame or that of a remainder portion of the same when the video data is contained in the information field 508; a field 503 which indicates whether video data contained in the packet is intra frame information or inter frame information; a field 504 which indicates the size of a video frame; a field 505 which indicates the packet number; a field 506 which indicates the packet length; a field 507 which indicates the send time of the packet; and the above-mentioned information field 508.

Figure 5:
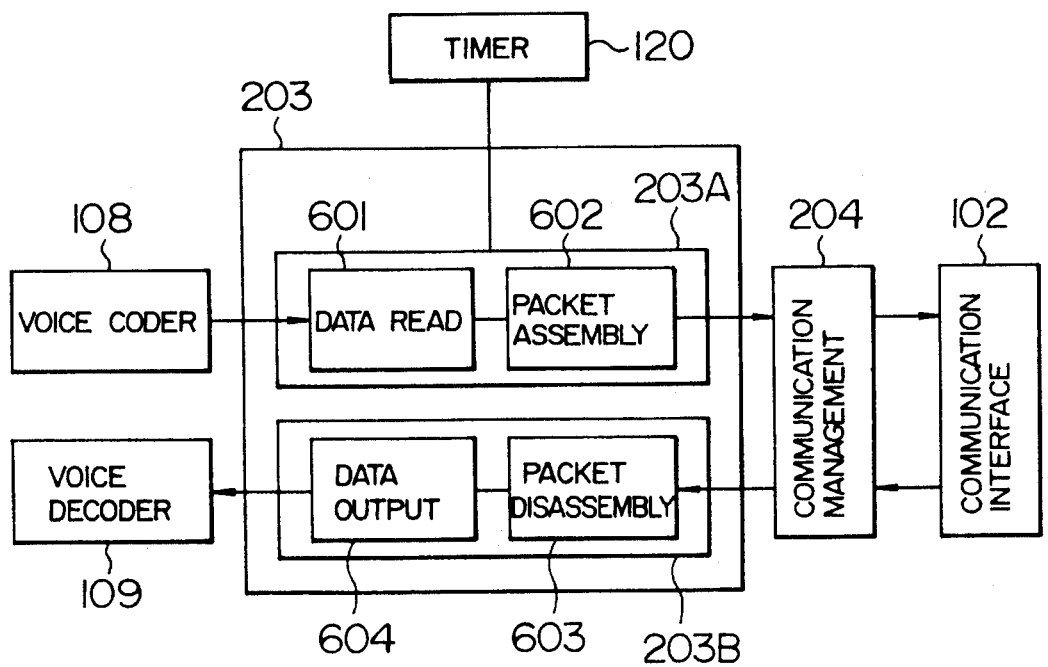
FIG. 5 is a block diagram showing the function of the voice communication control unit 203 shown in FIG. 3.

FIG. 5 shows the configuration of the voice communication control unit 203.

The voice communication control unit 203 is constituted by a voice data transmission unit 203A and a voice data receive unit 203B.

The voice data transmission unit 203A is constituted by a data read unit 601 for reading coded voice data from the voice coder 108 and a voice packet assembly unit 602 for generating a voice packet of a predetermined format in which current time designated by the timer 120 is added to the coded voice data read in the data read unit 601 and for sending the voice packet to the communication management unit 204.

The voice data receive unit 203B is constituted by a voice packet disassembly unit 603 for extracting coded voice data and other field items from a voice packet received from the communication management unit 204, and a data output unit 604 for supplying the coded voice data to the voice decoder 109.

Figure 6:
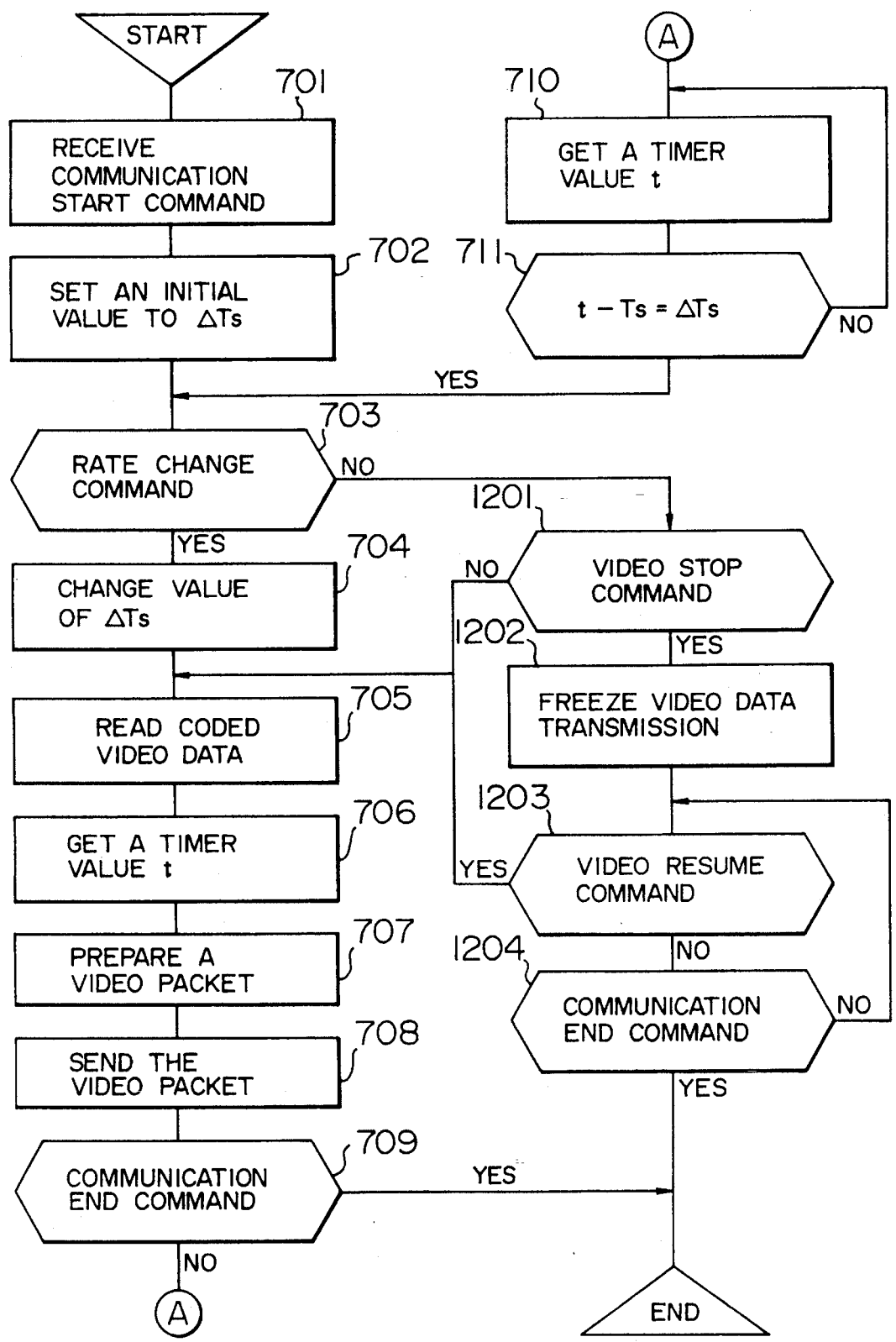
FIG. 6 is a flowchart of the program constituting the video transmission control unit 201 shown in FIG. 3.

FIG. 6 shows a flowchart for executing the control operation of the video transmission control unit 201.

When a video communication start command is received from the communication management unit 204 of a corresponding communication terminal station (step 701), a predetermined initial value is set as the video packet transmission interval ΔTs (step 702), and then transmission of coded video data is started with this packet transmission interval (the coding rate).

First, judgment is made as to whether a coding rate change request (a rate change command) has been received or not from a corresponding communication terminal station (step 703). If the judgment proves that a rate change request has been received in the step 703, the value of the video packet transmission interval ΔTs is changed into a value ΔR designated by the rate change request (step 704) and coded video data for one frame is read from the video coder 106 (step 705). Next, current time t is obtained from the timer 120 (step 706), and a video packet having transmission time Ts=t is generated (step 707) to be sent to the communication management unit 204 (step 708). Then judgment is made as to whether a communication end command has been received or not from the communication management unit 204 (step 709), and if YES, the video data transmission operation is ended. A communication end command is issued in response to communication end operation of a user. If no communication end command has been issued in step 709, on the contrary, current time t is obtained from the timer 120 (step 710) so that standby is continued until the time t−Ts=ΔTs is reached (step 711). At a point of time when the packet send interval has reached ΔTs in step 711, the operation is returned to step 703.

If no rate change command has been received in step 703, on the contrary, the operation is shifted to step 1201 in which judgment is made as to whether a video stop command has been issued or not from the corresponding communication terminal station. If a video stop command has been received in step 1201, the video data transmission operation is frozen (step 1202) and arrival of a video resume command from the corresponding communication terminal station or arrival of a communication end command from the communication management unit 204 is awaited (step 1203 or 1204). If a video resume command has been received (step 1203), the video data transmission operation is performed by repetition of step 705 et seq. If a communication end command has been received from the communication management unit 204 (step 1204), on the contrary, the video data transmission operation is ended.

Figure 7:
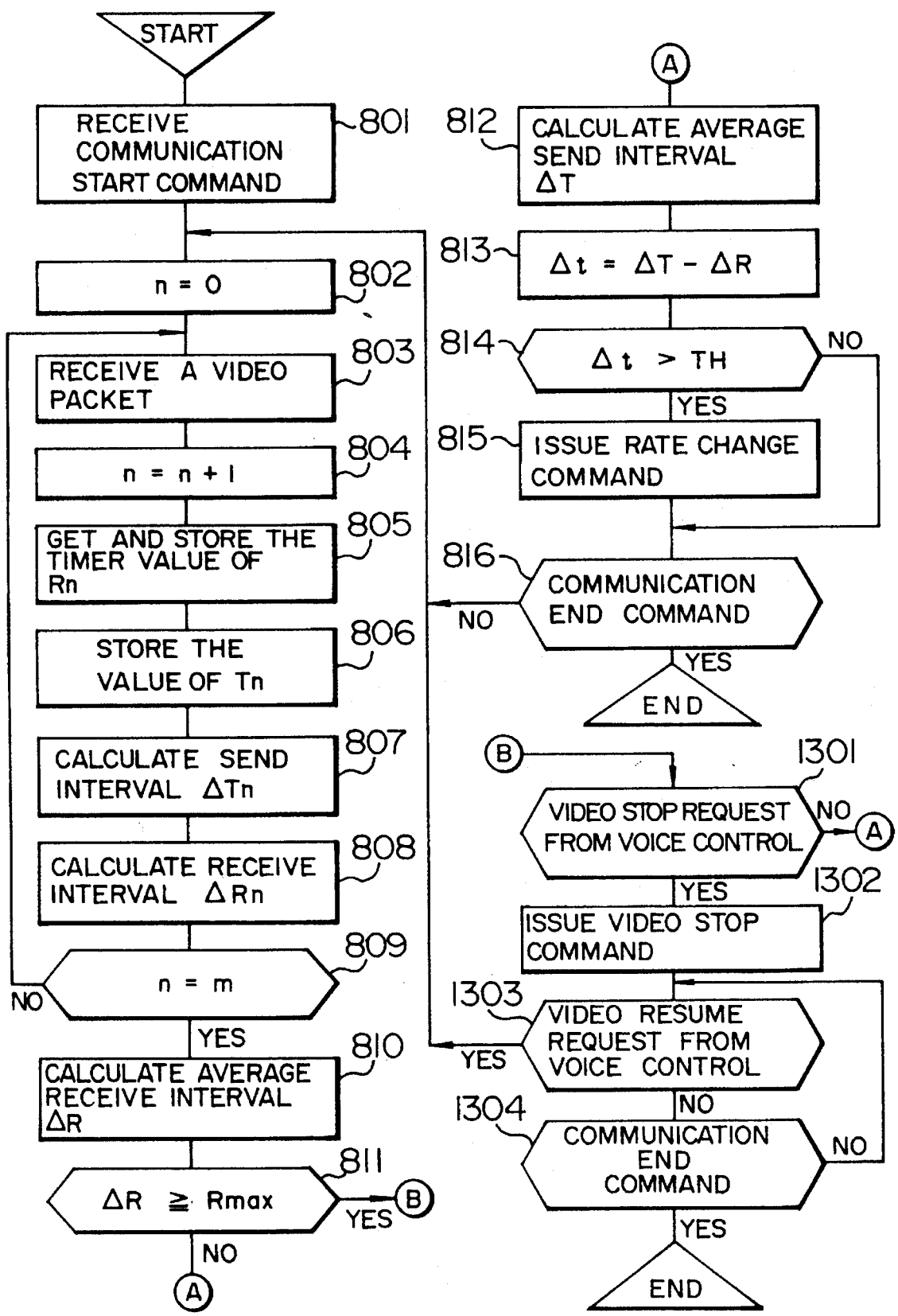
FIG. 7 is a flowchart of the program constituting the video receive control unit 202 shown in FIG. 3.

FIG. 7 shows a flowchart showing the control operation of the video receiving control unit 202.

When a communication start command is received from the communication management unit 204 (step 801), the value of the count parameter n of an observation period for calculating delay time which will be described later, specifically, the number of packets which is used as a population parameter when the packet transmission and arrival interval averages ΔT and ΔR are obtained, is cleared to be zero (step 802).

When a video packet is received from the network (step 803), the count parameter n is incremented (step 804) and current time indicated by the timer 120 and time extracted from the field 507 of the received packet are stored as the receive time Rn and transmission time Tn respectively in the table area of the memory 105 (steps 805 and 806). Next, a difference value ΔRn between the receive time Rn and the receive time Rn−1 of the preceding packet stored in the table area in advance and a difference value ΔTn between the transmission time Tn and the transmission time Tn−1 of the preceding received packet are calculated and stored in the table area as the receive and transmission intervals ΔRn and ΔTn respectively (steps 807 and 808).

Judgment is made as to whether the value of the count parameter n has reached a predetermined value m or not (step 809). If the count parameter n is smaller than m in step 809, the operation is returned to step 803 and the foregoing packet receiving operation is repeated.

If the judgment proves that n=m in step 809, on the contrary, an average ΔR of m values ΔR1~ ΔRm representing the receive intervals stored in the table area is calculated (step 810). The average ΔR of the receive intervals is compared with a predetermined limit value Rmax (step 811), and if ΔR<Rmax, the average ΔT of m values ΔT1~ΔTm representing the transmission intervals stored in the table area is calculated (step 812), and a difference value Δt(= ΔR−ΔT) between the average receive interval ΔR and the average transmission interval ΔT is calculated (step 813).

The difference value Δt represents transmission delay time of the network due to a traffic load. The value of Δt is compared with a predetermined threshold value TH (step 814), and if the value Δt is larger than the value TH, a rate change command is issued to the corresponding communication terminal station so as to instruct the corresponding terminal station to make the video packet transmission interval ΔTs agree with the average receive interval ΔR (step 815). Then, judgment is made as to whether a communication end command has been received or not from the corresponding communication terminal station (step 816). If a communication end command has been received in step 816, the communication is ended, while if no communication end command has been received, on the contrary, the operation is returned to step 802 so as to repeat the foregoing packet receiving operation.

In the case of ΔR≧Rmax in the step 811, on the contrary, judgment is made as to whether a video stop request has been issued from the voice receive control unit 203 or not (step 1301). If no video stop request has been issued in step 1301, the operation is shifted to step 812 and the foregoing calculation for obtaining the average transmission interval ΔT is performed. If a video stop request has been issued in step 1301, on the contrary, a communication mode change request for instructing stopping of video transmission is issued to the communication management unit 204 (step 1302). Thereafter, issuance of a video resume request from the voice communication control unit 203 or arrival of a communication end command is waited for (step 1303 or 1304). If a video resume request is received in step 1303, the operation is returned to step 802 and the foregoing video data packet receiving operation is resumed. If a communication end command is received in step 1304, on the other hand, the communication is ended.

In this embodiment, while two communication terminal stations are operating to perform communication with video packets, the receiving side terminal station observes the video packet receiving state (the difference value Δt between the average receive interval ΔR and the average transmission interval ΔT), and when a traffic load in the communication network increases so that the packet transmission delay (the difference value Δt) exceeds a threshold value, a command for reducing the video data transmission rate is issued to the transmission side terminal station. Accordingly, video communication according to the network load state can be carried out. Further, when the average receive interval ΔR of video packets reaches a limit value, the communication mode is changed over so as to stop video communication so that it is possible to carry out multimedia communication in which high communication quality of voice data is maintained.

Step 1301 may be omitted, though the configuration of FIG. 7 is such that when the average receive interval ΔR of video packets exceeds a threshold value (step 811), a video stop command is issued to the communication management unit when a video stop command is issued from the voice receiving control unit (steps 1301 and 1302).

Next, the configuration of the voice communication control unit 203 in the communication terminal station according to the present invention will be described.

Figure 8:
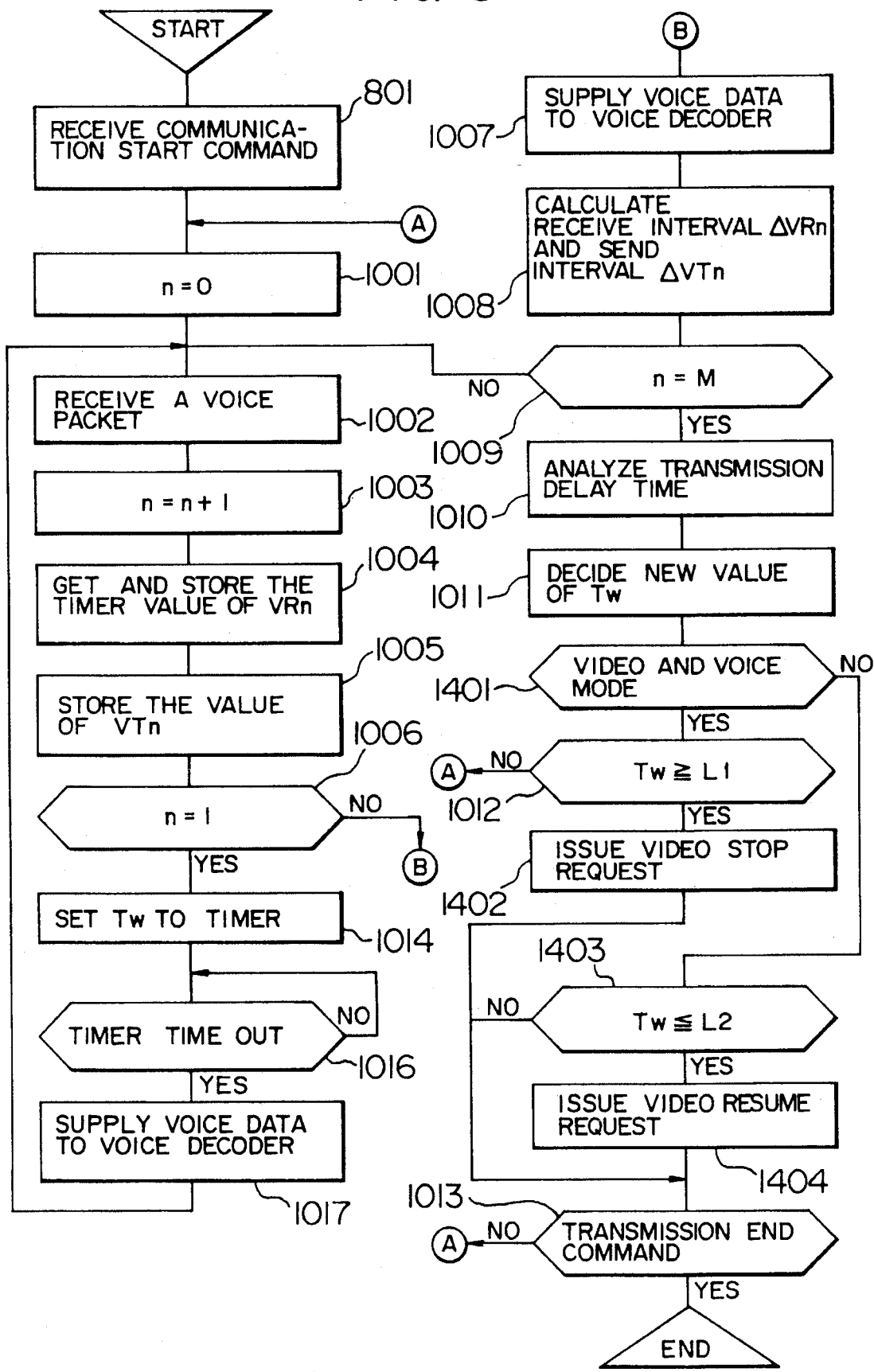
FIG. 8 is a flowchart showing an embodiment of the voice data receive unit 203B shown in FIG. 5.

FIG. 8 is a flowchart showing an embodiment of the data output unit 604 of the voice data receiving control unit 203B provided with a function of absorbing jitter in video packet transmission delay generated in the network and a function of issuing a video packet transmission mode change request.

As for the voice packet transmission delay jitter, the state of transmission delay is observed for every voice packet group composed of M voice packets, and the waiting time Tw for absorbing jitter is determined in accordance with the observed quantity of transmission delay, so that the timing of supply from the forefront voice data buffer memory to the voice decoder is adjusted in accordance with the above-mentioned waiting time Tw. The initial value of the waiting time Tw is made to be zero in advance.

When a voice communication start command is received from the communication management unit 204 (step 801), first, the value of the count parameter n for counting received voice packets is cleared to zero (step 1001).

When one voice packet is received into the buffer memory (step 1002), the value of the count parameter n is incremented (step 1003), and the current time indicated by the timer 120 and the time stamp added to the received voice packet are stored into the table area as the arrival time VRn and transmission time Vtn of the Nth voice packet respectively (steps 1004, 1005).

Next, the value of the count parameter n is judged (step 1006). If n=1, predetermined waiting time Tw is set to the timer (step 1014), and at a point of time when the timer has timed out (step 1016), the coded voice data read out from the buffer memory is supplied to the voice decoder (step 1017) and the operation is returned to step 1002.

If n≠1 in step 1006, the coded voice data is immediately read out from the buffer memory and supplied to the voice decoder 109 (step 1007). A difference value ΔVRn (packet arrival interval) between the preceding arrival time VRn−1 and the current arrival time VRn stored in the above-mentioned table areas and a difference value ΔVTn (packet transmission interval) between the preceding send time VTn−1 and the current transmission time VTn are calculated and the calculated data are stored in the table area (step 1008). Then, if n≠M (step 1009), the operation is returned to step 1002.

If the count parameter n becomes equal to M in step 1009, the distribution of packet transmission delay time in the network is analyzed from the data stored in the table area (step 1010), and the waiting time Tw to be applied thereafter is determined in accordance with the state of the analyzed distribution (step 1011). Next, the current multimedia communication mode is judged (step 1401) and if the current communication mode is a mode in which both the video and voice data are to be transmitted, judgment is made as to whether the waiting time Tw (or the transmission delay quantity) is not less than a predetermined upper limit value L1 or not (step 1012).

If the waiting time Tw is not smaller than the limit value L1, that is, if Tw≧L1 in step 1012, a video data transmission stop command is supplied to the communication management unit 204 (step 1402). If the current communication mode is a mode in which only the voice data are to be transmitted, on the contrary, judgment is made as to whether the waiting time Tw is less than or equal to a predetermined lower limit value L2 (where, L2<L1) or not (step 1403). If the waiting time Tw is not larger than the limit value L2, that is, if Tw≦L2 in the step 1403, a video data transmission resume request is issued and the mode is changed over to a communication mode in which communication of both the video data and voice data is made (step 1404). In the case where the waiting time Tw has a value between the limits L1 and L2, the communication mode is not changed. After these operations, judgment is made as to whether a communication end request has been received or not (step 1013). If a communication end request has been received in step 1013, the communication is ended. If no communication end request has been received in step 1013, on the contrary, the operation is returned to step 1001 in which the count parameter n is cleared to be zero, and then the foregoing step 1002 et seq. are repeated.

Figure 9:
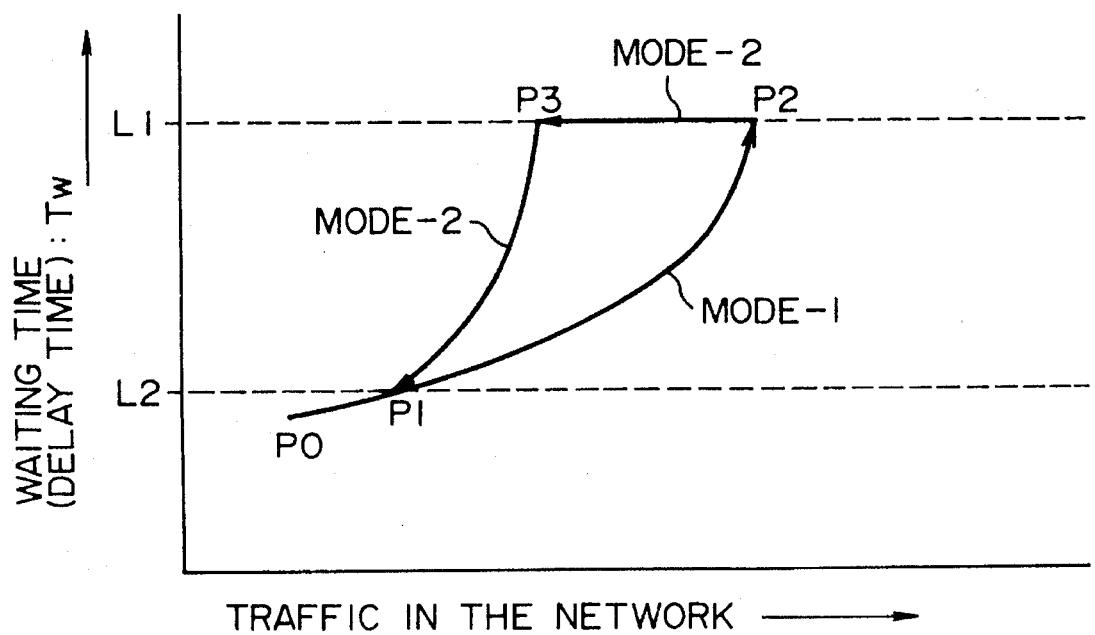
FIG. 9 is a diagram for explaining the relationship between the transmission mode change-over by the terminal station and the delay time according to the present invention.

FIG. 9 shows the relationship between the above-mentioned limit values L1 and L2 and the communication mode.

For example, assume that multimedia communication is started in a communication mode (mode 1) in which both video and voice data are transmitted at a point P0, then the waiting time (or delay time) Tw becomes longer as the traffic of the network becomes larger. If the value of Tw reaches the upper limit value L1, the video communication is interrupted (video freeze state) at a point P2 and the mode is changed over to another communication mode (mode 2) in which communication is made with only voice data. This communication mode 2 is maintained in a period where the waiting time Tw exceeds the upper limit value L1, or, unless the waiting time Tw becomes lower than the lower limit value L2, even in the case where the traffic of the network so decreases that the waiting time Tw becomes equal to or lower than the upper limit value L1 at a point P3. If the waiting time Tw reaches the lower limit value L2 at a point P1, the communication mode is changed to the mode 1 and the video transmission is resumed.

According to this embodiment, the receiving side communication terminal station not only performs decoding of voice data while absorbing jitter in delay time of voice data packets which varies in depending on the state of traffic in the network but also changes over the communication mode in accordance with the relation of size between the waiting time Tw for packet delay time or for absorption of delay time jitter and the limit values (L1 and L2). Accordingly, it is possible to control video data transmission mode in accordance with the traffic of the network, for maintaining the quality of communication.

Figure 10:
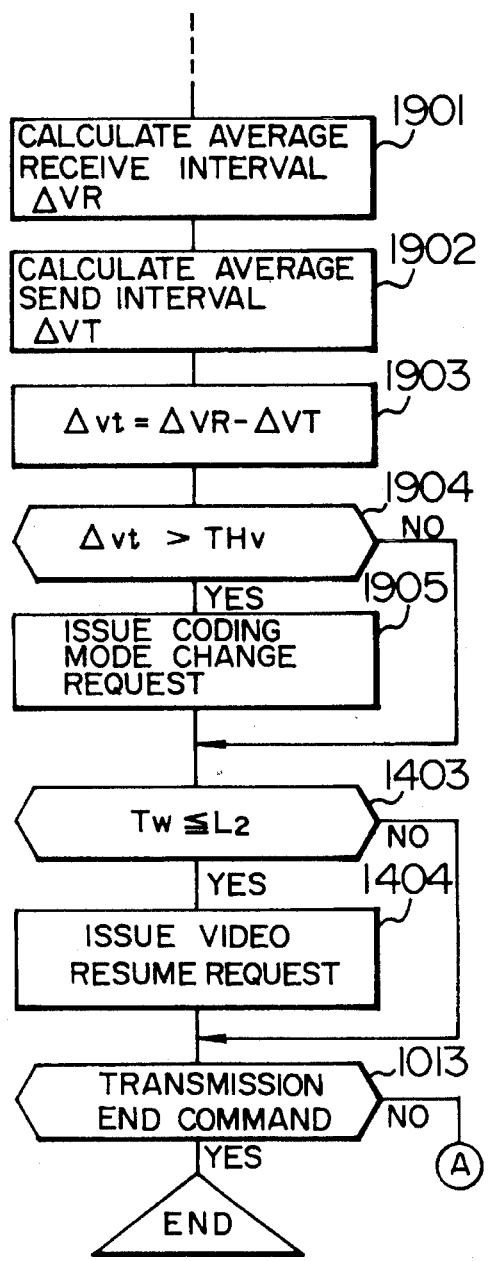
FIG. 10 is a flowchart showing a modification of the voice data receiving unit 203B shown in FIG. 5.

FIG. 10 shows another embodiment of the data output unit 604 of the voice data receive control unit 203B. According to this embodiment, it is made possible that the receiving side terminal station can instruct the transmission side terminal station to reduce the transmission quantity with respective to not only the video data but also the voice data. The flowchart of FIG. 10 is substituted for the part constituted by the steps 1403~1404 in the flowchart of FIG. 8.

That is, in the case where the current communication mode is the mode in which communication is made with respect to only voice data (step 1401 in FIG. 8), the average arrival interval $\Delta VR$ and average send interval $\Delta VT$ are calculated from the arrival intervals $\Delta VRi(i=1\sim M)$ and send intervals $\Delta VTi(i=1\sim M)$ stored in the above-mentioned table area (steps 1901, 1902), and then the difference value $\Delta rt$ between $\Delta VR$ and $\Delta VT$ is obtained (step 1903). The above-mentioned difference value $\Delta vt$ corresponds to the parameter indicating the packet transmission delay which varies in accordance with the traffic in the network.

Next, the above-mentioned value $\Delta vt$ is compared with a predetermined threshold value THv (step 1904), and when the value $\Delta vt$ is larger than the threshold value THv, a voice data coding mode change request is issued to the transmission side terminal station (step 1905). The voice data coding mode change request contains the value of the above-mentioned $\Delta vt$ as a parameter for designating the coding mode. Steps 1403 and 1404 are the same as those in the case of FIG. 8.

Figure 11:
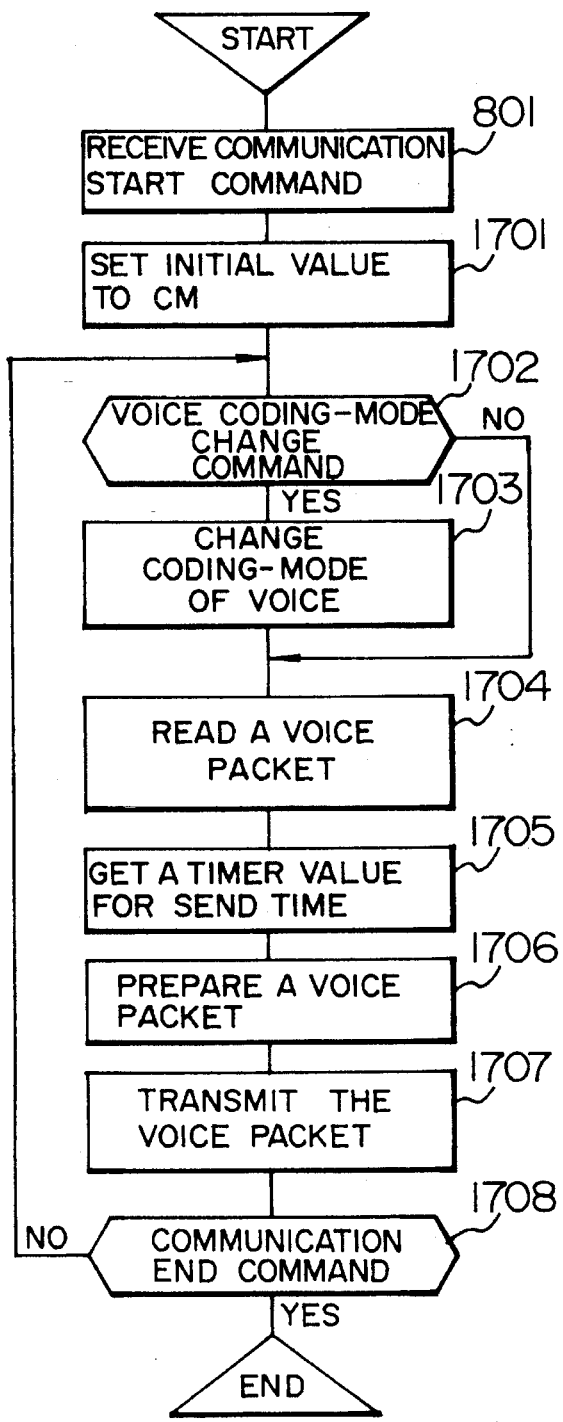
FIG. 11 is a flowchart showing an embodiment of the voice data transmission unit 203A shown in FIG. 5.

FIG. 11 is a flowchart showing an example of the data read unit 601 of the voice data transmission unit 203A provided with a function of coding voice data in the mode in accordance with the above-mentioned coding mode change request. When the traffic of the network is small (when the transmission delay of voice packets is small), voice data is coded in a normal mode, while when the traffic of the network is large (when the transmission delay of voice packets is large), for example, coded bits which give less influence to acoustic quality are eliminated to reduce the data quantity of voice packets in accordance with the traffic to thereby reduce the load of the network.

When communication start command is received from the communication management unit 204 (step 801), a code for designating voice coding having full bit data length is set, as an initial value, to the parameter CM for designating the voice coding mode or the coding rate (step 1701).

Next, judgment is made as to whether a voice coding mode change request has been received or not from the receiving side communication terminal station (step 1702), and if a voice coding mode change request has been received in step 1702, the coding mode designated by the request is set to the parameter CM (step 1703). In the example shown in FIG. 10, the voice coding mode change request contains the parameter $\Delta vt$. Accordingly, for example, if a conversion table indicating the relationship between the values of $\Delta vt$ and the codes showing the coding modes is prepared, a coding mode designating code corresponding to a specific value of $\Delta vt$ may be obtained from the conversion table when the specific value of $\Delta vt$ is given.

Next, the coding mode indicated by the above-mentioned parameter CM is designated to the voice coder 108 so that coded voice data for one packet is read (step 1704), current time is obtained from the timer 120 (step 1705), a voice packet of a predetermined format including the thus obtained coded voice data and time information is generated (step 1706), and the thus generated voice packet is transferred, as a transmission packet, to the communication management unit 204 (step 1707). Thereafter, judgment is made as to whether a communication end command has been received from the communication management unit 204 or not (step 1708). If YES in step 1708, voice communication is ended, while if NO the operation is returned to the step 1702 so as to repeat the foregoing operations.

Further, as the above-mentioned voice coder having a function capable of changing the bit length of the coded voice data, for example, it is possible to use that having such a configuration as disclosed in U.S. Pat. No. 4,903,301.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. A transmission control method in multimedia information communication performed between two terminal stations connected to each other through a packet switching network, each of said terminal stations having control means for performing transmission control for transmitting a video packet including coded video data and a voice packet including coded voice data to said packet switching network and for performing supply control for supplying said video packet and voice packet received from said packet switching network to a video codec and a voice codec respectively, said control method comprising the steps of:

one of said two terminal stations operating as a receiving side terminal station transmitting a video data transmission mode change request to the other terminal station operating as a multimedia information transmission side in accordance with a status of delay of video packets and/or voice packets received from said packet switching network; and said transmission side terminal station changing the video data transmission mode in response to said transmission mode change request.

2. A transmission control method according to claim 1, wherein said receiving side terminal station observes delay of video packets in said packet switching network so that said receiving side terminal station issues, as said transmission mode change request, a rate command for instructing changing of a video packet transmission interval in accordance with a quantity of the observed delay when delay of video packets exceeds a first threshold value and issues, as said transmission mode change request, a stop command for instructing stopping of video packet transmission when the delay of video packets exceeds a predetermined limit which is larger than said first threshold value, and said transmission side terminal station changes its communication mode from a first communication mode to transmit both video data and voice data into a second communication mode to transmit only voice data, in response to reception of said stop command.

3. A transmission control method according to claim 2, wherein said transmission side terminal station transmits each video packet with its transmission time added thereto to said packet switching network, and said receiving side terminal station calculates the quantity of delay of video packets on the basis of an arrival interval of video packets from said packet switching network and a transmission interval of video packets calculated from transmission time added to each video packet.

4. A transmission control method according to claim 1 wherein said receiving side terminal station observes delay of voice packets in said packet switching network so that said receiving side terminal station issues, as said transmission mode change request, a stop command for instructing stopping of video packet transmission when delay of voice packets becomes greater than or equal to a predetermined upper limit value and issues, as said transmission mode change request, a restart command for instructing restart of video packet transmission when delay of voice packets become less than or equal to a predetermined lower limit value, and said transmission side terminal station changes the communication mode from a first communication mode to transmit both video data and voice data to a second communication mode to transmit only voice data, in response to reception of said stop command, and changes from said second communication mode to said first communication mode in response to reception of said restart command.

5. A transmission control method according to claim 4, wherein said receive side terminal station observes delay of video packets in said packet switching network so that said receiving side terminal station issues, as said transmission mode change request, a rate command for instructing changing of a video packet transmission interval in accordance with a quantity of the observed delay when delay of video packets exceeds a predetermined threshold value, and said transmission side terminal station controls the video packet transmission interval in response to reception of said rate command.

6. A transmission control method according to claim 4, wherein said transmission side terminal station transmits each video packet with its transmission time added thereto and each voice packet with its transmission time added thereto, and said receive side terminal station calculates the quantity of delay of voice packets on the basis of an arrival interval of voice packets from said packet switching network and a transmission interval of voice packets calculated from transmission time added to each voice packet.

7. A transmission control method according to claim 6, wherein said receiving side terminal station calculates the quantity of delay of voice packets on the basis of a difference between an average arrival interval of voice packets and an average transmission interval of voice packets for every group of a predetermined number of voice packets received from said packet switching network.

8. A multimedia communication terminal station for performing multimedia communication with another terminal station through a packet switching network, comprising:

video data transmission control means for controlling transmission of a video packet including coded video data to said packet switching network;

video data reception control means for controlling supply of a video packet received from said packet switching network to a video decoding circuit;

voice data transmission control means for controlling transmission of a voice packet including coded voice data to said packet switching network; and voice data reception control means for controlling supply of a voice packet received from said packet switching network to a voice decoding circuit;

wherein said video reception control means includes:

first means for observing video packet delay time generated in said packet switching network, and second means for issuing a video data transmission mode change request to another terminal station in accordance with the delay time of video packets observed by said first means; and wherein said video data transmission control means controls a video packet transmission interval in response to a video data transmission mode change request received from another terminal station.

9. A multimedia communication terminal station according to claim 8, wherein said second means issues, as said transmission mode change request, a rate command for instructing changing of a video packet transmission interval in accordance with a quantity of the observed delay when delay of video packets exceeds a first threshold value and issues, as said transmission mode change request, a stop command for instructing stopping of video packet transmission when the delay of video packets exceeds a predetermined limit which is larger than said first threshold value, and said video data transmission control means controls the video packet transmission interval in response to a rate command received from another terminal station, and stops video packet transmission in response to a stop command received from another terminal station.

10. A multimedia communication terminal station according to claim 8, wherein said video data transmission control means sends each video packet with its transmission time added thereto to said packet switching network, and said first means calculates the delay time of video packets on the basis of an arrival interval of video packets from said packet switching network and a transmission interval of video packets calculated from transmission time added to each video packet.

11. A multimedia communication terminal station according to claim 8, wherein said voice data transmission control means includes third means for observing delay time of voice packets in said packet switching network, and fourth means for issuing, as said transmission mode change request, a stop command for instructing stopping of video packet transmission when the delay time of voice packets observed by said third means becomes greater than or equal to a predetermined upper limit value and issues, as said transmission mode change request, a restart command for instructing restarting of video packet transmission when the delay time of voice packets becomes less than or equal to a predetermined lower limit value; and said video data transmission control means stops video packet transmission in response to reception of a stop command received from another terminal station, and restarts video packet transmission in response to reception of a restart command received from another terminal station.

12. A multimedia communication terminal station according to claim 11, wherein said video data transmission control means observes delay time of video packets in said packet switching network to issue a rate command for instructing changing of a video packet transmission interval in accordance with a quantity of the observed delay when delay of video packets exceeds a predetermined threshold value, wherein further another terminal station controls the video packet send interval in response to reception of said rate command.

13. A multimedia communication terminal station according to claim 11, wherein said voice data transmission control means includes means for adding transmission time to each voice packet to be transmitted, and said voice data reception control means calculates the quantity of delay of voice packets on the basis of an arrival interval of voice packets from said packet switching network and a transmission interval of voice packets calculated from transmission time added to each voice packet.

14. A multimedia communication terminal station according to claim 13, wherein said voice data reception control means calculates the quantity of delay of voice packets on the basis of a difference between an average arrival interval of voice packets and an average transmission interval of voice packets for every group of a predetermined number of voice packets received from said packet switching network.

* * * * *